United States Patent [19]
Roberts

[11] Patent Number: 5,656,103
[45] Date of Patent: Aug. 12, 1997

[54] STEEL STRAP AND METHOD OF MAKING

[75] Inventor: Philip M. Roberts, Naperville, Ill.

[73] Assignee: Illinois Tool Works Inc., Glenview, Ill.

[21] Appl. No.: 742,268

[22] Filed: Oct. 31, 1996

Related U.S. Application Data

[63] Continuation of Ser. No. 234,116, Apr. 28, 1994, abandoned.

[51] Int. Cl.$^6$ .............................. C22C 38/00; C21D 8/02
[52] U.S. Cl. ..................... 148/320; 148/603; 420/8; 420/121; 420/129
[58] Field of Search ........................ 148/603, 320; 420/8, 121, 129

[56] References Cited

FOREIGN PATENT DOCUMENTS

| | | | |
|---|---|---|---|
| 55-77910 | 6/1980 | Japan | 148/603 |
| 57-126924 | 8/1982 | Japan | 148/603 |
| 3-72033 | 3/1991 | Japan | 148/603 |
| 5-239553 | 9/1993 | Japan . | |

OTHER PUBLICATIONS

McGannon, Harold E., "The Making, Shaping and Treating of Steel", 8th Ed., 1964.

Metals Handbook, 1948 edition, The American Society for Metals, 1948, pp. 352–353.

*Primary Examiner*—Sikyin Ip
*Attorney, Agent, or Firm*—Dvorak & Orum

[57] ABSTRACT

A non-heat treated, high tensile strength, highly formable steel strap that may be applied in a tensioned loop about packaged articles with a strapping machine. The strap is fabricated from a steel comprising approximately, 0.20 to 0.25 percent carbon, 0.30 to 0.60 percent manganese, 0.04 percent maximum phosphorus, 0.05 percent maximum sulfur, an aluminum in an amount sufficient for full aluminum kill, 0.10 percent maximum silicon, and a boron to free nitrogen ratio of approximately between 1.07 to 1.43. The steel is coiled at a coiling temperature of approximately 1100 degrees Fahrenheit to reduce self-annealing that occurs during air cooling after coiling. The coiled steel is then reduced approximately 80 percent by cold rolling to increase tensile strength before it is fabricated into steel strap which may be protected with a zinc coating.

6 Claims, No Drawings

STEEL STRAP AND METHOD OF MAKING

This application is a continuation of application Ser. No. 08/234,116, filed Apr. 28, 1994, now abandoned.

FIELD OF THE INVENTION

The present invention generally relates to a composition of a non-heat treated high tensile strength, and highly formable steel and method of making, wherein the steel is formed into a steel strap and method of forming that may be applied in a tensioned loop about packaged articles with a strapping machine.

BACKGROUND OF THE INVENTION

Articles packaged in a bundle, on a pallet or in a crate for shipping, storage and merchandising are often secured with a steel or polymer strap applied in a tensioned loop by an automatic or manually operated strapping machine. Some applications, and in particular those applications in which the strap secures a package having substantial weight such as a stack of bricks, require the use of a steel strap which has greater tensile strength and is less susceptible to deterioration by abrasion than polymer and existing non-heat treated metal strap. Further, although certain existing steel strap is readily applicable to heavy packaged articles having cylindrical shapes and otherwise smooth or obtuse surfaces, there are limitations on the extent to which it can be formed under tension over and around sharp edges and corners of a package. More specifically, packages having sharp edges or corners with a small radius of curvature, for example a 90 degree corner, pose a problem for existing steel strap because the strap is subject to tremendous stress and strain as the strap tension is increased to an extent necessary to secure the packaged article. This stress and strain frequently causes the strap to fracture proximate to the edge or corner of the packaged article. Particularly, the relatively low ductility of non-heat treated strap contributes to the failure of strap used in this application. This problem may be particularly severe in applications in which the strap is applied and tensioned with an automatic strapping machine which generates a high tension in a short time interval during a rapid strap application process. Steel strap failure may be prevented by reducing the tension applied to the strap, but reducing strap tension may result in insecurely packaged articles and is therefore often an unacceptable alternative. It has also been suggested to place a shield between sharp edges or corners of the packaged articles and the strap to reduce strap stress and strain, but this requires an additional step that is time consuming and not readily integratable in an automated strapping operation. Further, in many applications, the placement of a shield between the package corners and the strap may not positively offset strap forces in a manner to prevent strap fracture or failure.

The physical properties of the steel that comprises the steel strap determine the tensile strength and the formability of the strap. Iron based material suitable for steel strap generally includes carbon which is added to the steel to increase the tensile strength of the strap. The addition of carbon however also tends to increase steel embrittlement which decreases steel formability and, accordingly, the ability of steel strap to be formed over and around corners without fracturing. Free nitrogen is another source of steel embrittlement as well as a source of strain aging, which causes steel to kink during plastic deformation. In low carbon steels, the detrimental effects of free nitrogen overshadow the detrimental effects of carbon. These detrimental effects generally result from the ability of free nitrogen and carbon to diffuse rapidly throughout the structure of the steel and congregate in imperfections or dislocations that occur in the lattice structure when the steel is subject to plastic deformation. The congregation of free nitrogen and, to a lesser extent, carbon atoms prevents the individual atoms of the lattice structure from moving about the lattice structure from one position to the next position, and a result of this congregation is that the lattice structure will lock up and fracture rather than undergo plastic deformation.

It is known that adding elements like titanium, zirconium, or boron to steel will scavenge free nitrogen, that is, remove detrimental amounts of free nitrogen from the steel by reacting with the free nitrogen to form titanium nitride, zirconium nitride, or boron nitride, respectively. Removal of free nitrogen results in improved formability and ductility, decreased work hardening and the elimination of nitrogen related strain aging. The formation of nitrides of titanium and zirconium, however, are known to cause fracture of the steel matrix during cold reduction, and to decrease residual ductility in full hard cold rolled steels. Further, the addition of nitrogen scavenging elements in amounts in excess of that required for free nitrogen scavenging will increase the hardenability and decrease the formability of the steel, and further additions may result in embrittlement.

It is also known that reduction of steel by cold working will increase steel tensile strength thereby allowing a decrease in the carbon content while still maintaining a fixed tensile strength. But reduction of steel by cold working also increases steel embrittlement and decreases steel formability. In applications where steel formability is important, therefore, reduction by cold working has been performed to a limited extent to avoid embrittlement and the attending loss in steel formability. For example, in pipe manufacturing processes, reduction of steel by cold working is limited to approximately 10 percent because further reduction by cold working would increase steel embrittlement to the extent that the steel could not be shaped into a pipe without fracturing.

It is well known in the art to improve the tensile strength of steel by alloying with other elements, or by heat treatment. However, those methods are relatively costly, and are not generally appropriate solutions to the problems associated with steel strapping. Also, the heat treating requires energy input, thereby exacerbating the ever present energy shortage.

SUMMARY OF THE INVENTION

In view of the discussion above, there exists a demonstrated need for an advancement in the art of a steel strap for strapping applications.

It is therefore an object of the present invention to provide a novel steel strap.

It is also an object of the present invention to provide a novel non-heat treated steel strap that has a high tensile strength and is highly formable.

It is another object of the present invention to provide a novel steel strap fabricated of a steel containing aluminum in an amount sufficient for full aluminum kill, wherein the aluminum removes detrimental amounts of oxygen and detrimental amounts of nitrogen.

It is a further object of the present invention to provide a novel steel strap fabricated of a steel comprising a ratio of boron to free nitrogen in an mount that removes free nitrogen without increasing steel hardenability and steel embrittlement.

It is still a further object of the present invention to provide a novel steel strap fabricated of a steel that is coiled at a temperature that reduces self-annealing that occurs during air cooling after coiling.

It is yet a further object of the present invention to provide a novel steel strap fabricated of a steel that is reduced on the order of 80 percent by cold working to increase tensile strength while at the same time retaining an acceptable degree of formability.

Accordingly, the present invention is directed toward a novel composition of a high tensile strength, highly formable non-heat treated steel and method of making, wherein said steel is well suited for use as a steel strap that may be applied in a tensioned loop about packaged articles with a strapping machine. The strap is fabricated from a steel comprising, approximately, 0.20 to 0.25 percent carbon, 0.30 to 0.60 percent manganese, 0.04 percent maximum phosphorus, 0.05 percent maximum sulfur, aluminum in an mount sufficient for full aluminum kill, wherein the aluminum removes otherwise detrimental mounts of oxygen and free nitrogen, 0.10 percent maximum silicon, wherein the silicon removes otherwise detrimental mounts of oxygen, and a boron to free nitrogen ratio in a range of approximately 1.07 to 1.43, wherein the boron also removes free nitrogen but does not increase hardenability and embrittlement. The steel is coiled at a coiling temperature of approximately 1100 degrees Fahrenheit to reduce self-annealing that occurs during air cooling after coiling. In a second embodiment, the steel is coiled at a temperature below 1100 degrees Fahrenheit to reduce self-annealing that occurs during air cooling after coiling. The coiled steel is then reduced approximately 80 percent by cold rolling before it is fabricated into a steel strap which may be protected with a zinc coating.

These and other objects, features and advantages of the present invention will become apparent upon consideration of the following Detailed Description of the Invention.

DETAILED DESCRIPTION OF THE INVENTION

The present invention comprises a composition and method of making a high tensile strength and highly formable non-heat treated steel strap usable in a strapping machine. The steel strap may be used for securing heavy packages having edges or corners over and around which the steel strap must be formed without fracturing, for example a stack of bricks. In one embodiment, the steel strap has a sectional dimension of approximately 0.500 inches by 0.020 inches and in a second embodiment, the steel strap has a sectional dimension of approximately 0.625 inches by 0.020 inches. The invention, however, is applicable to steel straps having any sectional dimension. The steel straps of the exemplary embodiments have the following approximate physical characteristics which were determined by experimentation.

|  | Sectional Dimension | |
| --- | --- | --- |
|  | 0.500" by 0.020" | 0.625" by 0.020" |
| Break Strength | 1235 to 1766 lbs. | 1545 to 2200 lbs. |
| Tensile Strength | 130 to 160 KSI | 130 to 160 KSI |
| Elongation | 0 to 4% | 0 to 4% |
| Bend Test | 1 R minimum | 1 R minimum. |

The bend test essentially involves bending the strap over a sharp corner 90°, and then returning the strap to its original orientation. A result of 1 R means the strap was bent 90° and returned to the original orientation one time without failure.

The invention involves preparing an iron heat, adjusting the boron level, forming a steel sheet, coiling at the appropriate temperature, and substantial reduction of the steel by cold rolling.

The heat generally comprises a combination of elements having the following chemistry, which percentages are approximate.

0.20 to 0.25 percent Carbon;

0.30 to 0.60 percent Manganese;

0.04 percent maximum Phosphorus;

0.05 percent maximum Sulfur;

Al=AK;

0.10 percent maximum Silicon; and 1.07 to 1.43 B/N (Boron to Nitrogen ratio).

BALANCE IRON WITH INCIDENTAL IMPURITIES

The carbon is added in an amount that provides tensile strength without increasing embrittlement to the extent that it would adversely effect formability. The aluminum is added in an amount sufficient for full aluminum kill (AK). More specifically, the aluminum is added in an amount that removes otherwise detrimental amounts of oxygen and free nitrogen by reacting with oxygen to form aluminum oxide and by reacting with free nitrogen to form aluminum nitride. The silicon also removes oxygen by reacting with oxygen to form silicon oxide. The boron is also added to remove free nitrogen from the steel by reacting with the free nitrogen to form boron nitride. The boron, however, reacts with the free nitrogen that does not react with the aluminum to form aluminum nitride. The amount of boron added depends on the amount of free nitrogen in the iron and is therefore expressed in terms of a boron to nitrogen ratio which in the present invention is in the range of approximately 1.07 to 1.43. Boron is added only to the extent necessary for nitrogen scavenging and is not added in an excess amount that would increase hardenability and embrittlement. The reaction of aluminum and silicon with oxygen to form aluminum oxide and silicon oxide prevents boron from reacting with oxygen to form boron oxide. The aluminum and silicon reactions with oxygen preserve the boron, which would otherwise be consumed in the formation of boron oxide. The heat should not include elements such as titanium or zirconium which scavenge nitrogen more efficiently than boron. These efficient nitrogen scavengers react with nitrogen more readily than boron will react with nitrogen leaving no nitrogen to react with the boron and the resulting free boron may then function to increase hardenability and embrittlement.

In one embodiment, the heat includes the combination of a commercial grade low carbon steel, for example AISI 1023, and aluminum, silicon, and boron. AISI 1023 has carbon, manganese, phosphorus, and sulphur in the above specified ranges and nitrogen in a range of approximately 0.0035 to 0.0065 percent. The boron will therefore be added in an mount in a range of approximately 0.005 to 0.007 percent to obtain a boron to nitrogen ratio between a range of approximately 1.07 to 1.43. In the event that the free nitrogen content is more or less, the boron content should be adjusted to ensure adherence to the above specified boron to free nitrogen ratio which will optimize nitrogen scavenging without degrading formability. The resulting steel is then cast into a steel ingot which may be rolled into a steel slab or, in an alternative embodiment, the steel may be strand cast into a steel slab, for further processing.

The steel slab is processed in a hot mill where it is hot rolled to form a hot band. During the slabbing process, the steel slab may pass through a reheating furnace before being rolled into a hot band by a plurality of roughing stands and finishing stands. After the steel band leaves the finishing stand it is processed by a coiling stand where it is formed into coils and then allowed to air cool. During air cooling, the steel undergoes a self-annealing which tends to reduce tensile strength, and results in otherwise detrimental effects on the steel. In one embodiment, the steel is uniformly cooled after the finishing stage and coiled at a coiling temperature of approximately 1100 degrees Fahrenheit to reduce self-annealing that occurs during air cooling after the coiling stage. After coiling and after air cooling, the coiled steel is reduced more than 70 percent by cold rolling before fabrication into steel strap. In another embodiment, the steel strap is reduced approximately 80 percent by cold rolling before fabrication into steel strap. The steel strap may also be galvanized with a zinc paint, by electro-plating or by hot dipping to provide a coating which protects the steel strap from corrosion.

The foregoing is a description enabling one of ordinary skill in the art to make and use the preferred embodiments of the present invention. It will be appreciated by those skilled in the art that variations, modifications and equivalents to the embodiments disclosed herein exist. The present invention therefore is to be limited only by the scope of the appended claims.

What is claimed is:

1. A non-heat treated steel strap usable in a strapping machine, the steel strap having a tensile strength in a range of approximately 130 to 160 KSI, an elongation in a range of approximately 0.0 to 4.0 percent, and a minimum bend of 1 R, the steel strap fabricated from a coiled steel reduced by cold rolling, the steel strap composition consisting of:

0.20 to 0.25 percent carbon, 0.30 to 0.60 percent manganese, 0.04 percent maximum phosphorous, 0.0035 to 0.0065 percent nitrogen, 0.05 percent maximum sulfur, 0.10 percent maximum silicon, wherein the silicon removes oxygen by reacting with oxygen to form silicon oxide, aluminum added in an amount sufficient for full aluminum kill, wherein the aluminum removes oxygen by reacting with oxygen to form aluminum oxide and the aluminum removes free nitrogen by reacting with free nitrogen to form aluminum nitride, and boron added in an amount sufficient for establishing a boron to free nitrogen ratio in a range of approximately 1.07 to 1.43, wherein the boron removes free nitrogen by reacting with free nitrogen to form boron nitride, and the balance being iron with incidental impurities, wherein the steel is coiled at a coiling temperature of approximately 1100 degrees Fahrenheit in order to reduce self-annealing such that the coiled steel is reducable by approximately 80 percent by cold rolling without heat treating after cold reduction.

2. The steel strap of claim 1 wherein the steel strap comprises a sectional dimension of approximately 0.500 inch by 0.020 inch and the steel strap has a break strength in a range of approximately 1235 lbs to 1766 lbs.

3. The steel strap of claim 1 wherein the strap comprises a sectional dimension of approximately 0.625 inch by 0.020 inch and the steel strap has a break strength in a range of approximately 1545 lbs to 2200 lbs.

4. The steel strap of claim 1 wherein the steel is coiled at a coiling temperature below 1100 degrees Fahrenheit to reduce a self-annealing that occurs during air cooling after coiling.

5. A method of making a steel strap usable in a strapping machine, the steel strap fabricated of a steel having a tensile strength in a range of approximately 130 to 160 KSI, an elongation in a range of approximately 0.0 to 4.0 percent, and a minimum bend of 1 R, consisting of the steps of:

forming a steel consisting of approximately 0.20 to 0.25 percent carbon, 0.30 to 0.60 percent manganese, 0.0035 to 0.0065 percent nitrogen, 0.04 percent maximum phosphorus, 0.05 percent maximum sulfur, 0.10 percent maximum silicon for removing oxygen by reacting with oxygen to form silicon oxide, and the balance being iron with incidental impurities, then reacting aluminum within said steel in an amount sufficient for full aluminum kill, wherein the aluminum removes oxygen by reacting with oxygen to form aluminum oxide, and the aluminum removes free nitrogen by reacting with free nitrogen to form aluminum nitride, then adding boron to said killed steel in an amount between 0.005 to 0.007 percent in order to achieve a boron to free nitrogen ratio of between approximately 1.07 to 1.43, wherein the boron removes free nitrogen by reacting with free nitrogen to form boron nitride;

hot rolling said steel into a continuous sheet of hot band steel;

coiling the steel at a coiling temperature of approximately 1100 degrees Fahrenheit to reduce a self-annealing that occurs during air cooling after coiling;

reducing the coiled steel approximately 80 percent by cold rolling to increase tensile strength; then recoiling the cold rolled sheet without heat treating the sheet; then fabricating the cold rolled sheet into steel straps without heat treating the straps.

6. The method of claim 5 wherein the steel is coiled at a temperature below 1100 degrees Fahrenheit to reduce a self-annealing that occurs during air cooling after coiling.

* * * * *